(12) United States Patent
Celerier (10) Patent No.: US 9,650,160 B2
(45) Date of Patent: May 16, 2017

(54) SATELLITE WITH DEPLOYABLE PAYLOAD MODULES

(71) Applicant: THALES, Neuilly-sur-Seine (FR)

(72) Inventor: Bruno Celerier, Auribeau sur Saigne (FR)

(73) Assignee: THALES, Courbevoie (FR)

( * ) Notice: Subject to any disclaimer, the term of this patent is extended or adjusted under 35 U.S.C. 154(b) by 701 days.

(21) Appl. No.: 14/046,613

(22) Filed: Oct. 4, 2013

(65) Prior Publication Data

US 2014/0097981 A1    Apr. 10, 2014

(30) Foreign Application Priority Data

Oct. 5, 2012   (FR) ..................................... 12 02663

(51) Int. Cl.
| | |
|---|---|
| *B64G 1/52* | (2006.01) |
| *H04B 7/185* | (2006.01) |
| *B64G 1/10* | (2006.01) |
| *B64G 1/54* | (2006.01) |
| *G01S 19/02* | (2010.01) |
| *B64G 1/22* | (2006.01) |
| *B64G 1/44* | (2006.01) |
| *B64G 1/50* | (2006.01) |

(52) U.S. Cl.
CPC ........... *B64G 1/1007* (2013.01); *B64G 1/222* (2013.01); *B64G 1/54* (2013.01); *G01S 19/02* (2013.01); *B64G 1/44* (2013.01); *B64G 1/503* (2013.01); *B64G 2001/1092* (2013.01)

(58) Field of Classification Search
CPC ........ B64G 1/1007; B64G 1/50; B64G 1/503; B64G 1/54; B64G 1/58; B64G 2001/1092; B64G 1/222
USPC ...... 342/352; 244/171.7, 171.8, 173.1, 173.3
See application file for complete search history.

(56) References Cited

U.S. PATENT DOCUMENTS 5,806,800 A * 9/1998 Caplin ................... B64G 1/503
 165/41
5,816,540 A * 10/1998 Murphy ................... B64G 1/24
 244/164

(Continued)

FOREIGN PATENT DOCUMENTS

EP        0780296 A1   6/1997
GB        2319360 A    5/1998

(Continued)

*Primary Examiner* — Chuong P Nguyen
(74) *Attorney, Agent, or Firm* — Baker & Hostetler LLP (57) ABSTRACT

A telecommunication satellite with geostationary orbit comprises an upper module, a lower module, and a lateral module, disposed in a storage configuration between the upper module and the lower module, and deployed to an operational configuration of the satellite in the orbit by a rotation in relation to an axis Z oriented towards the earth in the operational configuration. The lateral module comprises two substantially plane and mutually parallel main surfaces, termed dissipative surfaces, able to dissipate by radiation a quantity of heat generated by facilities of the satellite; the dissipative surfaces being, in the operational configuration, held in a manner substantially parallel to the plane of the orbit, making it possible to limit the solar flux received by the dissipative surfaces and to optimize the quantity of heat dissipated by the lateral module.

19 Claims, 5 Drawing Sheets

(56) References Cited

U.S. PATENT DOCUMENTS

| | | | | |
|---|---|---|---|---|
| 6,220,548 | B1* | 4/2001 | Hyman | B64G 1/503 244/172.6 |
| 6,669,147 | B2* | 12/2003 | Bertheux | B64G 1/503 244/172.6 |
| 7,028,953 | B2* | 4/2006 | Sebata | B64G 1/503 244/171.8 |
| 8,448,902 | B2* | 5/2013 | Gelon | B64G 1/1007 244/158.1 |
| 2005/0023415 | A1 | 2/2005 | Walker et al. | |

FOREIGN PATENT DOCUMENTS

| | | |
|---|---|---|
| WO | 94/29927 A1 | 12/1994 |
| WO | 99/19212 A1 | 4/1999 |
| WO | 03/059740 A1 | 7/2003 |

* cited by examiner

SATELLITE WITH DEPLOYABLE PAYLOAD MODULES

CROSS-REFERENCE TO RELATED APPLICATION

This application claims priority to foreign French patent application No. FR 1202663, filed on Oct. 5, 2012, the disclosure of which is incorporated by reference in its entirety.

FIELD OF THE INVENTION

The present invention relates to the field of telecommunication satellites and more particularly it pertains to a satellite architecture comprising one or more payload modules deployable after a phase of launching the satellite.

BACKGROUND

A telecommunication satellite is placed in mission orbit by the combination of a launcher spacecraft and of its own propulsion means. According to a known technique, diverse service instruments and mission instruments are held against the structure of the satellite in a first configuration, termed the storage configuration. After separation with the launcher spacecraft, these instruments are deployed to an operational configuration allowing their operation. Thus, the implementation of solar generators held against North and South faces of a parallelepipedal structure during a launch phase, and deployed and oriented towards the sun after separation of the launcher craft, is known. It is also known to employ antenna reflectors held against East and West faces of the structure in the storage configuration and deployed so as to allow during the mission the reflection of a beam of waves between a source block fixed to the structure and a zone of coverage of the terrestrial globe.

The increasing of the payload capacity of a satellite within the limits imposed by the nose cone of the launcher spacecraft remains an important issue. Advances in telecommunications services (reduction in the size and power of the user terminals on the ground, geographical reuse of frequencies, related to the sparseness of the spectrum, search for more precise contours formed) involve improvements to the performance of antennas. Employing high focal length antennas, or antenna reflectors of wide diameter, constitutes an avenue of progress. To boost the power of antennas, it is also apposite to increase the dissipative capacity of the satellite so as to optimize the evacuation of heat generated by the mission instruments. More generally, it is sought to increase the area of the surface for rigging facilities on the structure of the satellite, within the limits imposed by the nose cone of the launcher craft.

Figure 1A:
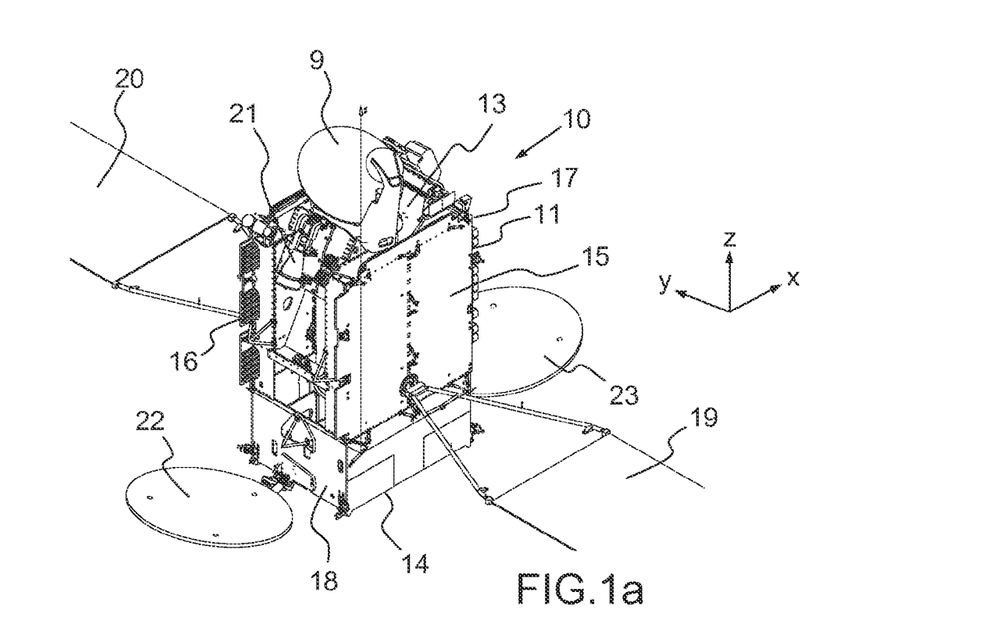
FIGS. 1a and 1b, already presented, represent a telecommunication satellite of customary architecture, in the operational configuration and in the storage configuration.
Figure 1B:
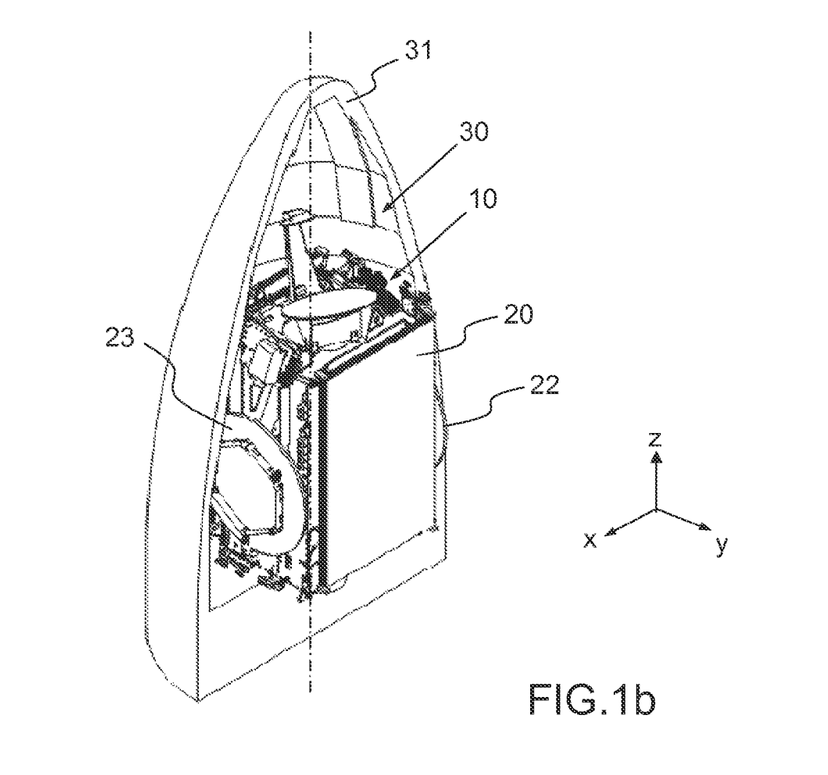

FIGS. 1a and 1b represent a telecommunication satellite of customary architecture. A satellite 10 is represented in FIG. 1a in an operational configuration allowing the operation of the mission instruments of the satellite in its orbit. The satellite 10 is represented in FIG. 1b in a storage configuration. As represented in FIG. 1b, the satellite can be placed in the interior volume 30 of a nose cone 31 of a launcher spacecraft.

A telecommunication satellite of customary architecture generally comprises a substantially parallelepipedal structure 11 whose orientation is held constant with respect to the earth in the operational configuration. The person skilled in the art uses a reference trihedron tied to the satellite consisting of an axis Z oriented towards the earth, of an axis Y perpendicular to the plane of the orbit, and of an axis X forming with the Y and Z axes a right-handed orthogonal reference frame; the X axis then lying along the direction of the velocity in the particular case of circular orbits.

In a conventional architecture, a face 13 of the structure 11, perpendicular to the Z axis, is commonly called the earth face because of its orientation towards the earth, the opposite face 14 commonly being called the anti-earth face. A face 15 perpendicular to the Y axis and oriented towards the North in the terrestrial magnetic field is called the North face; the opposite face 16 commonly being called the South face. A face 17 perpendicular to the X axis and oriented in the direction of the displacement of the satellite is called the East face; the opposite face 18 commonly being called the West face.

On the North and South faces are customarily fixed solar generators 19 and 20 which ensure the electrical energy supply to the satellite. These latter are motorized so that the surfaces which bear the photovoltaic cells always point towards the sun. The North and South faces also have the particular feature, whatever the position of the satellite in the orbit, of receiving the solar flux with a low or indeed zero incidence. They are therefore used to radiate into space the energy dissipated by the operation of the electrical facilities of the satellite. The other faces receive the solar flux with a high incidence according to the position of the satellite in its orbit. In the storage configuration, the solar generators are folded up and held against the North and South faces so as to limit their bulk and ensure that they are held so as to withstand the dynamic accelerations and the high vibratory stresses of the launch phase.

On the earth face are generally mounted diverse mission instruments, such as for example a gregorian telecommunication antenna 9 such as represented in FIG. 1a. The anti-earth face is generally used to fix the satellite to the launcher. It also generally carries the apogee motor charged with ensuring that the satellite is placed on station as a supplement to the launcher spacecraft.

The East and West faces can be used to rig up antennas. Antennas comprising a radiofrequency source 21 fixed on the structure of the satellite and a deployable reflector 22 such as represented in FIG. 1a are in particular known. In the storage configuration, the antenna reflector is held against an East or West face, it is thereafter deployed by a rotation motion around an axis substantially parallel to the Y axis. In the operational configuration, the reflector 22 is positioned so as to reflect, in an optimal manner, a beam of waves between the radiofrequency source 21 and a targeted terrestrial coverage zone. The radiofrequency sources, associated with reflectors deployed as East or West faces are usually fixed to the structure of the satellite on the East or West faces, or on the edges common to the East or West faces and to the earth face, or else on the earth face in the case of the use of intermediate reflectors, which ensure the reflection of the beam of waves between the source and the deployable reflector.

The current solutions suffer from limits that the present invention seeks to solve. Thus, an antenna reflector held against the structure of the satellite is constrained by the dimensions of the structure of the satellite having to be stored in the nose cone of a launcher craft. Typically the diameter of the rigid reflectors 22 and 23 is generally limited to the dimensions of the faces of the parallelepipedal structure of the satellite. A known alternative solution consists in having unfurlable reflectors consisting of several rigid parts. This type of reflector which generates interference of the beam by the presence on the reflecting surface of uncontrolled reliefs related to the deployment of the various rigid parts of the reflector is in practice little used.

Moreover, the dissipative capacity of a satellite is constrained by the dimensions of the North and South faces. To improve this dissipative capacity, alternative solutions consisting of unfurlable radiators are envisaged. Here again, these alternative solutions exhibit difficulties: complexity and cost of the thermal system, increase in the mass, loss of reliability, limitation of the deployment zones not interfering with the reflectors.

SUMMARY OF THE INVENTION

A new satellite architecture implementing wide deployable payload modules is proposed by the present invention. The expected benefits of such an architecture are above all a capacity for carrying rigid reflectors of very wide diameters and a large increase in the dissipative capacity of the satellite thus configured. Other benefits will also appear on reading the description of the invention.

The invention is aimed at proposing an alternative solution allowing notably the carriage of rigid reflectors of wide diameters and an increase in the dissipative capacity of the satellite while alleviating the implementational difficulties cited hereinabove.

For this purpose, the subject of the invention is a telecommunication satellite with geostationary orbit comprising an upper module, a lower module, and one or more lateral modules, which are disposed in a storage configuration between the upper module and the lower module, and are deployed to an operational configuration of the satellite in the orbit by a rotation in relation to an axis Z oriented towards the earth in the operational configuration. Each of the lateral modules comprises two substantially plane and mutually parallel main surfaces, termed dissipative surfaces, able to dissipate by radiation a quantity of heat generated by facilities of the satellite; the said dissipative surfaces being, in the operational configuration, held in a manner substantially parallel to the plane of the orbit, making it possible to limit the solar flux received by the dissipative surfaces and to optimize the quantity of heat dissipated by the lateral module.

Advantageously, at least one lateral module comprises two articulations, linked respectively to the upper module and to the lower module, configured so as to allow the rotation of the said lateral module in relation to the Z axis, from the storage configuration to the operational configuration.

Advantageously, the satellite furthermore comprises a rigid structure linking on the one hand the upper module and on the other hand the lower module. Advantageously, at least one lateral module comprises at least one articulation linked to the rigid structure, configured so as to allow the rotation of the said lateral module in relation to the Z axis, from the storage configuration to the operational configuration.

In a favoured embodiment of the present invention, at least one lateral module furthermore comprises at least one telecommunication device comprising an antenna reflector, a motorized mechanism linking the antenna reflector to the lateral module, and a radiofrequency source fixed to the lateral module and able to emit or receive a beam of waves. The said motorized mechanism is configured to hold, in the storage configuration, the reflector between the upper module and the lower module, and in a manner substantially parallel to one of the dissipative surfaces of the lateral module and to displace and hold the said reflector, in the operational configuration, in a position allowing the reflection of a beam of waves between the radiofrequency source and a predefined zone of coverage of the terrestrial globe.

Advantageously, the radiofrequency source of one of the telecommunication devices is fixed against a dissipative surface of the lateral module.

Advantageously, the radiofrequency source of one of the telecommunication devices is fixed against a surface of the lateral module that is adjacent and substantially perpendicular to the two dissipative surfaces.

Advantageously, at least one lateral module comprises several telecommunication devices; the said satellite furthermore comprising means of communication between the telecommunication devices, the upper module and/or the lower module; the said communication means comprising a physical link or a link in free space.

The satellite can also comprise a substantially spindly mechanical reinforcement, linking the upper module and the lower module, and able to rigidify the satellite.

The satellite can furthermore comprise a set of solar generators held in the storage configuration against one of the dissipative surfaces of a lateral module.

Advantageously, the set of solar generators is fixed to a lateral module, to the upper module or to the lower module. Preferably, the set of solar generators is linked electrically to the lower module.

In a particularly advantageous embodiment, the satellite comprises two lateral modules configured in such a way that, in the storage configuration, the dissipative surfaces of the two lateral modules are substantially mutually parallel.

Advantageously, at least one lateral module is deployed from the storage configuration to the operational configuration by a rotation of an angle substantially equal to 90 degrees.

Advantageously, at least one lateral module is deployed from the storage configuration to the operational configuration by a rotation of an angle substantially equal to 180 degrees.

BRIEF DESCRIPTION OF THE DRAWINGS

The invention will be better understood and other advantages will become apparent on reading the detailed description of the embodiments given by way of example in the following figures.

For the sake of clarity, the same elements will bear the same labels in the various figures. Hereinafter, reference is made to the reference trihedron composed of the previously described axes X, Y and Z. The orientation of the satellite can be identified in each of the figures by means of the trihedron represented in the figure.

DETAILED DESCRIPTION

Figure 2:
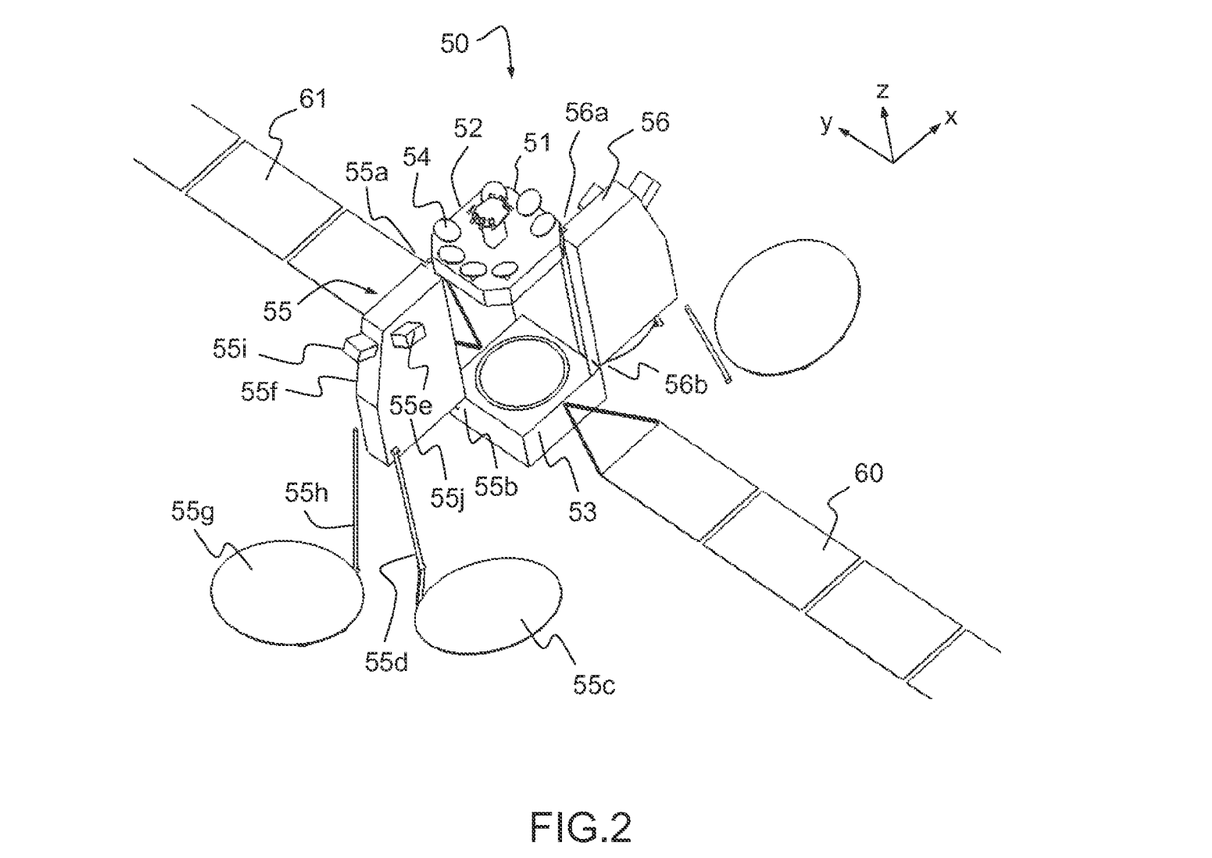
FIG. 2 represents an embodiment of a telecommunication satellite according to the invention, in the operational configuration.

FIG. 2 represents an embodiment of a telecommunication satellite according to the invention. In this embodiment, a telecommunication satellite with geostationary orbit 50 comprises a rigid structure 51, an upper module 52 and a lower module 53. The upper 52 and lower 53 modules are secured to the rigid structure 51. In the operational configuration, the satellite being in its mission orbit, the rigid structure is oriented in a constant manner along an axis Z directed towards the earth. The upper module 52 and the lower module 53 form two ends of the structure along the Z axis. The upper module 52 is disposed as close as possible to the earth in the operational configuration. The lower module 53 is disposed as far as possible from the earth in the operational configuration. Stated otherwise, the upper module 52 is oriented towards the earth; the lower module 53 is oriented in a direction opposite to the earth. In a preferred implementation of the present invention, the upper module 52 comprises a set of mission instruments; these may notably be telecommunications instruments 54 such as represented in FIG. 2. The lower module 53 preferably comprises service instruments. These may in particular be propulsion systems, for orbital transfer and/or for maintaining on station, and storage devices (battery, propellant tank, Xenon tank).

The satellite 50 also comprises two lateral modules 55 and 56. In this embodiment, each module is linked on the one hand to the upper module 52 and on the other hand to the lower module 53, by way of two articulations. The articulations of the lateral module 55 with respectively the upper 52 and lower 53 modules are denoted 55a and 55b; and the articulations of the lateral module 56 with respectively the upper 52 and lower 53 modules are denoted 56a and 56b. For each module, the articulations are configured so as to allow the rotation of the lateral module in relation to the Z axis. In an alternative embodiment, the rotation of a lateral module in relation to the Z axis will be able to be rigged up not with the upper 52 and lower 53 modules but with the rigid structure 51 directly. In this case, the lateral module comprises at least one articulation linked to the rigid structure 51 configured so as to allow the rotation of the said lateral module in relation to the Z axis.

In the storage configuration the lateral modules are folded up and held against the structure 51 of the satellite. On completion of a phase of launching the satellite into its mission orbit, the lateral modules are deployed to the operational configuration by a rotation with axis Z.

Each lateral module comprises two substantially plane and mutually parallel main surfaces, termed dissipative surfaces. The aim of these surfaces is to dissipate by radiation a quantity of heat generated by facilities of the satellite. This may notably be the heat generated by the telecommunications systems for the emission of radiofrequency signals of high power. To optimize the heat dissipation, the surfaces are preferably overlaid at least partially by a coating having high emissivity and low absorptivity, such as for example quartz mirrors or white paint. These may also be materials of OSR type, the acronym standing for Optical Surface Radiator.

With the aim of limiting the solar flux received by the dissipative surfaces and thus optimizing the quantity of heat dissipated by the lateral module, the lateral modules are positioned in the operational configuration in such a way that their dissipative surfaces are held in a manner substantially parallel to the geostationary orbit, or stated otherwise parallel to the plane (X, Z). Thus positioned, the dissipative surfaces receive the solar flux with a low or indeed zero incidence.

In the embodiment that we have described, the satellite comprises a rigid structure 51 on which the upper module 52 and the lower module 53 are fixed. This embodiment is not limiting of the present invention, it is also envisaged not to employ a rigid structure such as this, the upper module 52 and the lower module 53 then being linked by the deployable lateral modules. Thus, the present invention pertains more generally to a telecommunication satellite with geostationary orbit comprising an upper module 52 and a lower module 53. The satellite comprises one or more lateral modules, which are disposed in a storage configuration between the upper module 52 and the lower module 53, and are deployed to an operational configuration of the satellite in the orbit by a rotation in relation to an axis Z oriented towards the earth in the operational configuration.

The implementation of the deployable lateral modules according to the invention is particularly advantageous since it makes it possible to increase the dissipative capacity by a factor of close to 2 with respect to a conventional architecture already presented. Indeed, by employing lateral modules of large dimensions in relation to the Z axis and upper 52 and lower 53 modules of low dimensions in relation to this axis, each dissipative surface exhibits a capacity close to that of the North or South faces of a satellite of customary architecture. The satellite 50, which comprises two lateral modules, comprises four dissipative surfaces, and therefore a dissipative capacity close to twice that of a satellite of conventional architecture.

The lateral module 55 furthermore comprises a telecommunication device comprising an antenna reflector 55c, a motorized mechanism 55d linking the antenna reflector 55c to the lateral module 55, and a radiofrequency source 55e fixed to the lateral module 55 and able to emit or receive a beam of waves.

The motorized mechanism 55d is configured to hold, in the storage configuration, the reflector 55c against a dissipative surface of the lateral module 55 termed the internal dissipative surface 55f, oriented in the storage configuration towards the structure 51 of the satellite 50. This storage configuration is described in greater detail in FIGS. 3a and 3b.

The motorized mechanism 55d is also configured to displace and hold the reflector 55c, in the operational configuration, in a position allowing the reflection of a beam of waves between the radiofrequency source 55e and a predefined zone of coverage of the terrestrial globe.

The lateral module 55 also comprises a second telecommunication device comprising an antenna reflector 55g, a motorized mechanism 55h and a radiofrequency source 55i. The motorized mechanism 55d of the first telecommunication device links the reflector 55c to the lateral module 55 by way of a dissipative surface, termed the external dissipative surface 55j, oriented in a direction opposite to the structure 51 of the satellite. The motorized mechanism 55h of the second telecommunication device links the reflector 55g to the lateral module 55 by way of the internal dissipative surface 55f.

In a preferred embodiment, the radiofrequency source 55e of the first telecommunication device is fixed against the external dissipative surface 55j of the lateral module 55. The radiofrequency source 55i of the second telecommunication device is fixed against a surface of the lateral module 55 that is adjacent and substantially perpendicular to the two dissipative surfaces 55f and 55j.

A difficulty of the present invention resides in the connection of the telecommunication devices fixed on the lateral modules with the structure of the satellite. The articulation between the lateral modules and the structure renders connection by link of waveguide type difficult and expensive. The lateral modules advantageously comprise means of communication by a physical link or a link in free space. These may be radio-frequency links in free space at low power, optical links or digital links. These communication means can be implemented between the telecommunication devices of one or more lateral modules, the upper module 52 and/or the lower module 53.

Figure 3A:
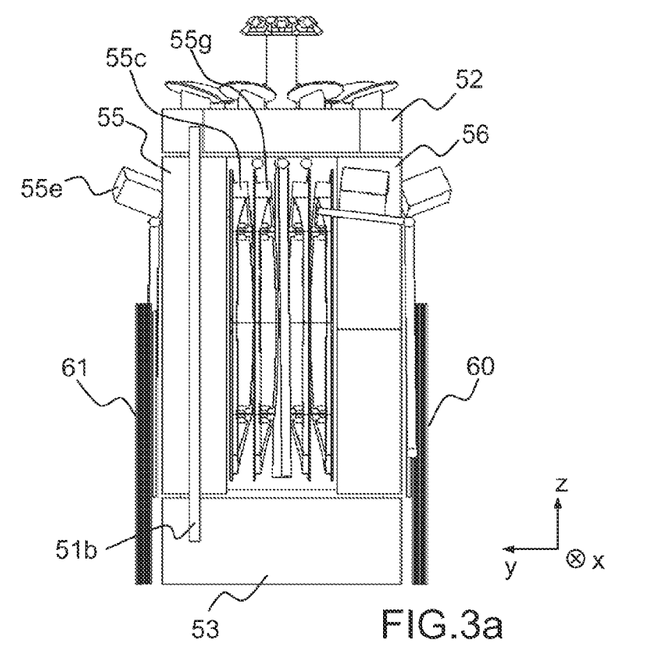
FIGS. 3a and 3b represent, according to two side views, a telecommunication satellite according to this embodiment, in the storage configuration.
Figure 3B:
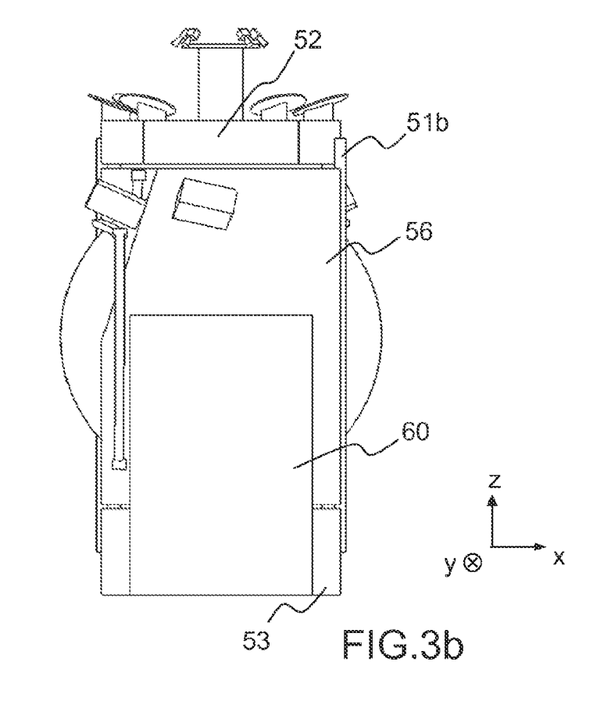

FIGS. 3a and 3b represent, according to two side views, a telecommunication satellite according to the embodiment described in FIG. 2, in the storage configuration. As described previously, the satellite 50 comprises an upper module 52, a lower module 53 and two lateral modules 55 and 56. In a preferred embodiment represented in FIGS. 2, 3a and 3b, each lateral module 55 and 56 is deployed from the storage configuration to the operational configuration by a rotation of an angle substantially equal to 180 degrees. By holding the lateral modules between the upper and lower modules and along their extension, the satellite exhibits in the storage configuration a substantially parallelepipedal shape. The lateral modules 55 and 56 occupy the location of the South and North faces of a conventional architecture. In an alternative embodiment of the invention, the lateral modules are deployed from the storage configuration to the operational configuration by a rotation of an angle substantially equal to 90 degrees; the lateral modules occupying in this case the location of the East and West faces of a conventional architecture. Note also that the satellite according to the invention comprises one or more lateral modules. In the embodiment represented in the figures, the satellite comprises two lateral modules configured in such a way that, in the storage configuration, the dissipative surfaces of the two lateral modules are substantially mutually parallel.

In this embodiment, each lateral module comprises two telecommunication devices. In the storage configuration, the reflector 55c is held against the internal dissipative surface 55f of the said lateral module. The second reflector 55g is held against the first reflector 55c.

The number of lateral modules, as well as the number of telecommunication devices of each of the lateral modules, such as represented in the figures, do not constitute limits to the present invention. Likewise, the storage of a first reflector against the internal dissipative surface, and of a second reflector against the first reflector is a nonlimiting embodiment of the invention. The invention pertains more generally to a satellite of which a lateral module comprises at least one telecommunication device comprising an antenna reflector, a motorized mechanism linking the antenna reflector to the lateral module, and a radiofrequency source fixed to the lateral module; the motorized mechanism being configured to hold, in the storage configuration, the reflector between the upper module 52 and the lower module 53 and in a manner substantially parallel to one of the dissipative surfaces of the module, and to displace and hold the said reflector, in the operational configuration, in a position allowing the reflection of a beam of waves between the radiofrequency source and a predefined zone of coverage of the terrestrial globe.

This configuration is particularly advantageous since it makes it possible to install rigid reflectors onboard, at the centre of the structure of the satellite. It becomes possible to install rigid reflectors onboard, in one piece and of very large diameters. As we have described in FIG. 1b, the diameter of reflectors stored against the faces of the parallelepipedal structure 11 is limited to the dimensions of its faces. The nose cones of launcher spacecraft usually being axisymmetric, positioning the reflector at the centre of the structure, between the upper and lower modules, makes it possible to dispense with the limit of the dimensions of the structure of the satellite. Carriage of reflectors of diameters close to the diameter of the nose cone becomes possible. Typically, the architecture of the satellite described by the present invention advantageously allows the storage of rigid reflectors of diameters of as much as 5 meters.

With the aim of reinforcing the mechanical rigidity of the structure whatever the angular position of the lateral modules, the satellite can comprise a substantially spindly mechanical reinforcement 51b linking the upper module 52 and the lower module 53. Advantageously, a mechanical reinforcement 51b is positioned along the articulations of each lateral module, and is linked to the upper 52 and lower 53 modules, in proximity to the articulations. In an alternative implementation, one or more mechanical reinforcements are positioned between the reflectors of the two modules 55 and 56, close to the centre of the structure. Several materials can be envisaged for these mechanical reinforcements; these may in particular be carbon tubes which exhibit the advantage of high mechanical strength for a competitive mass.

The satellite also comprises two sets of solar generators 60 and 61. A set of solar generators can consist of several panels folded up against one another in the storage configuration and deployed after launcher separation. In the embodiment of the invention, represented in the figures, the sets of solar generators 60 and 61 are fixed on the lower module 53 of the satellite. They can also be fixed on the upper module 52 or on a lateral module of the satellite, and linked electrically to the lower module 53 which generally comprises the batteries.

Advantageously, the satellite comprises at least one set of solar generators held in the storage configuration against the external dissipative surface of a lateral module. In FIGS. 3a and 3b, the set of solar generators 60 is held in the storage configuration against the external dissipative surface of the lateral module 56. The set of solar generators 61 is held in the storage configuration against the external dissipative surface 55f of the lateral module 55.

When the satellite is freed from the launcher spacecraft, the solar generators are deployed, at least partially, so as to allow electrical energy production and allow the rotation of the lateral modules. The lateral modules are then deployed, at least partially, by rotation in relation to the Z axis. Finally, the motorized mechanisms of the various telecommunication devices ensure the successive deployment of the reflectors to the operational configuration.

Figure 4A:
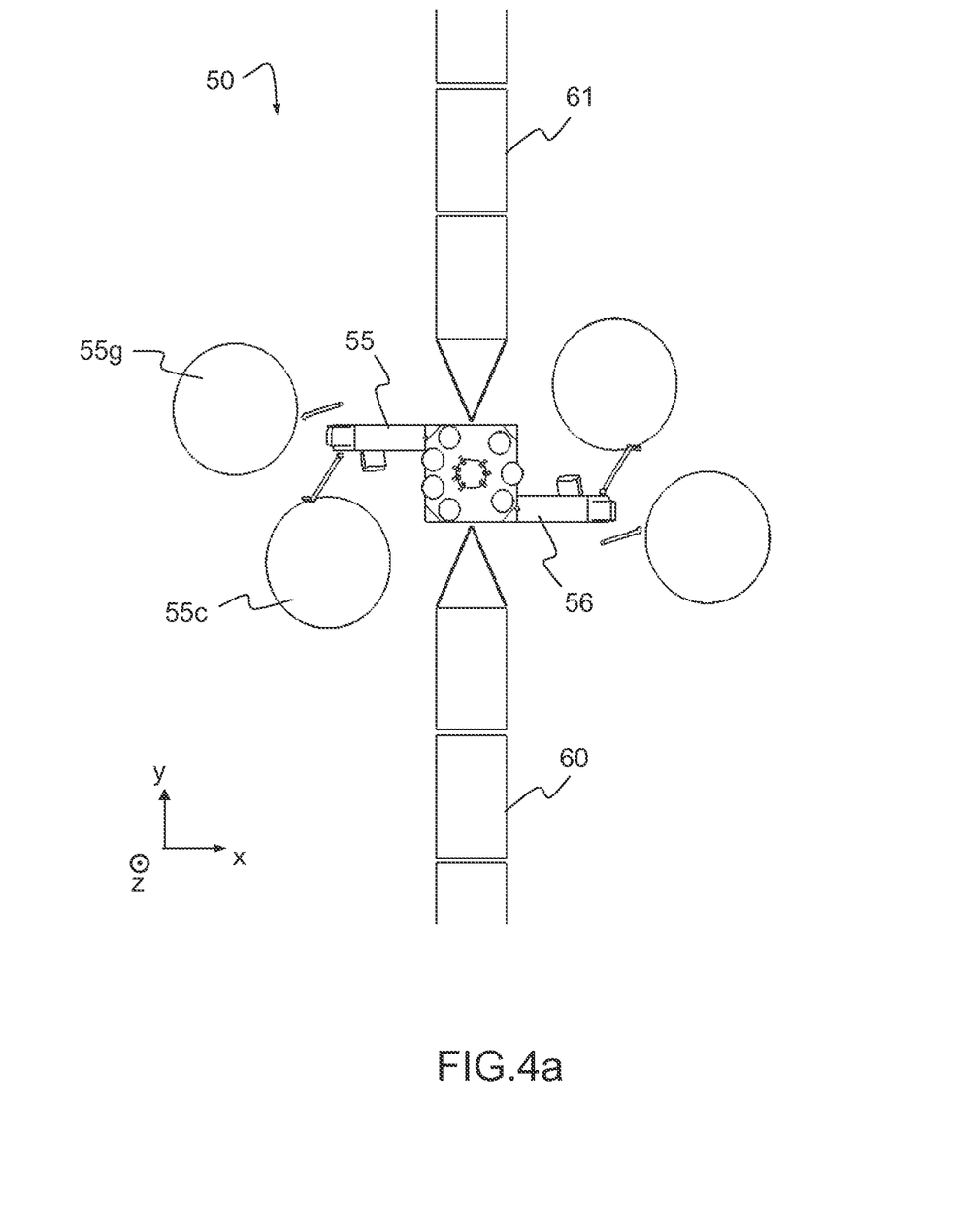
FIGS. 4a, 4b and 4c represent, according to three views, a telecommunication satellite according to this embodiment.
Figure 4B:
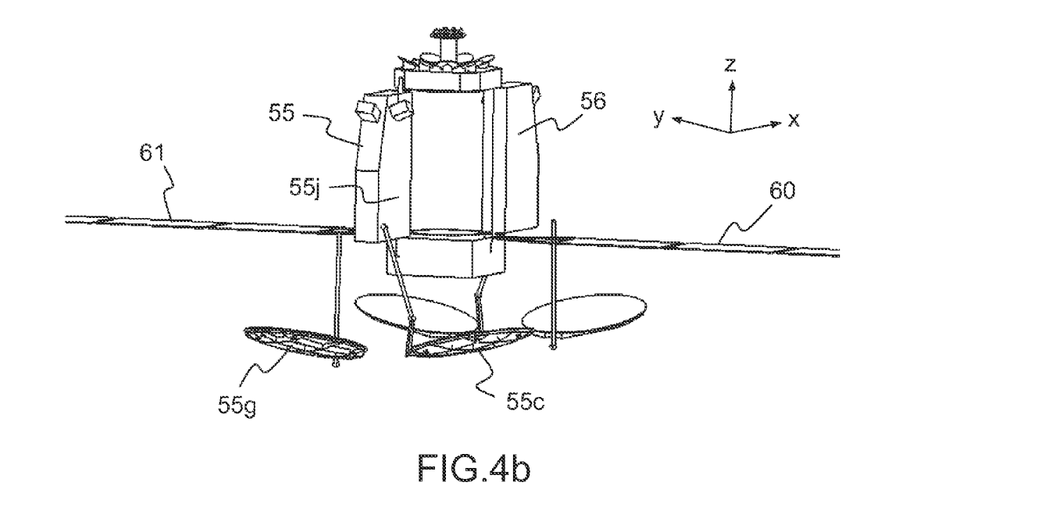
Figure 4C:
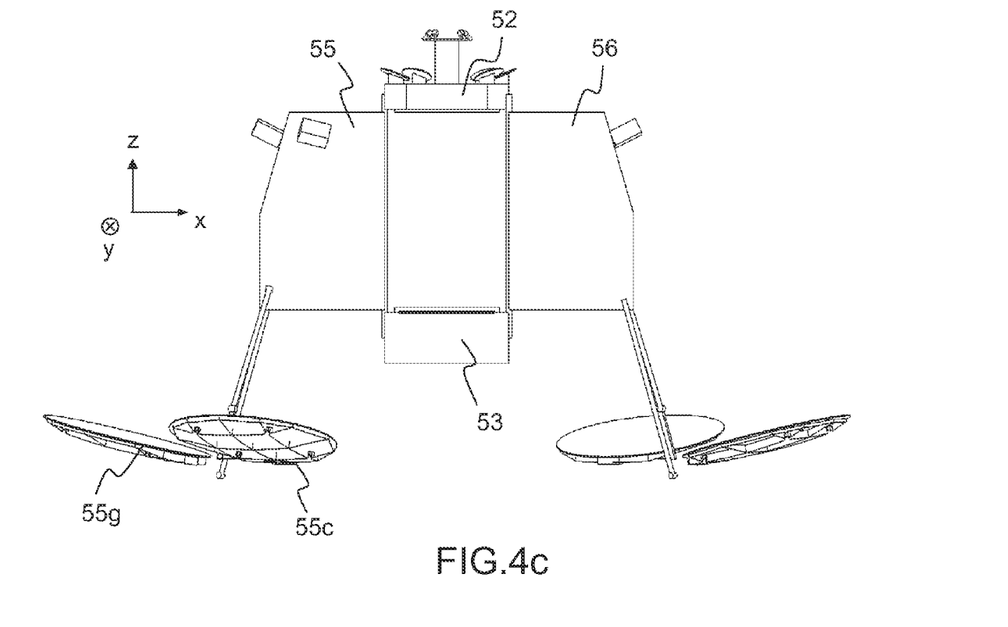

FIGS. 4a, 4b and 4c represent, according to three views, a telecommunication satellite according to the embodiment described previously. The various identifiable components of the satellite 50 in these views are such as described previously, and are therefore not repeated in detail here.

These various views illustrate the benefits of the architecture of the satellite with respect to the solutions known from the prior art. Firstly, the proposed architecture makes it possible to install rigid reflectors of very wide diameters onboard. By storing these reflectors at the centre of the structure, the maximum diameter which can be installed onboard is no longer constrained by the dimensions of the structure but by the diameter of the nose cone of the launcher spacecraft. By way of example, for a commercial launcher of Ariane type, this signifies a reflector diameter of up to 5 meters. Note also that the focal length of the antennas thus configured is substantially greater than that accessible through a conventional architecture, limited by the dimensions of the structure of the satellite. As a function of the definition of the motorized mechanism and of the location of the radiofrequency source, focal lengths lying between 3 and 7 meters are envisaged, or indeed more if necessary by means of articulated offset arms. Mention has also been made of the increase in the dissipative capacity by a factor of close to 2 with respect to a conventional architecture. More generally the deployable lateral modules make it possible to increase the area of the satellite rigging surface. Diverse mission or service facilities can be fixed to these deployable lateral modules, offering a new flexibility of design. Mission or service facility is understood to mean by way of nonlimiting example, a telecommunication device, a set of solar generators, or any other device in communication with the upper module or the lower module of the satellite.

The invention claimed is:

1. A telecommunication satellite with geostationary orbit comprising:
   an upper module;
   a lower module;
   a lateral module, disposed in a storage configuration between the upper module and the lower module, and deployed to an operational configuration of the satellite in the orbit by a rotation in relation to an axis Z oriented towards the earth in the operational configuration;
   at least one mission or service facility linked to the lateral module so as to move at least with the rotation of the lateral module in relation to the axis Z,
   wherein the lateral module includes two substantially plane and mutually parallel main surfaces that define dissipative surfaces able to dissipate by radiation a quantity of heat generated by the satellite, and
   wherein the dissipative surfaces, in the operational configuration, are held in a manner substantially parallel to the plane of the orbit, making it possible to limit the solar flux received by the dissipative surfaces and to optimize the quantity of heat dissipated by the lateral module.

2. The satellite according to claim 1, wherein the lateral module comprises two articulations, linked respectively to the upper module and to the lower module, configured so as to allow the rotation of the said lateral module in relation to the Z axis, from the storage configuration to the operational configuration.

3. The satellite according to claim 1, further comprising a rigid structure linking the upper module and the lower module.

4. The satellite according to claim 3, wherein the lateral module includes at least one articulation linked to the rigid structure configured so as to allow the rotation of the lateral module in relation to the Z axis from the storage configuration to the operational configuration.

5. The satellite according to claim 1,
   wherein the at least one mission or service facility is a telecommunication device including an antenna reflector, a motorized mechanism linking the antenna reflector to the lateral module, and a radiofrequency source fixed to the lateral module and able to emit or receive a beam of waves,
   wherein the motorized mechanism is configured to hold, in the storage configuration, the reflector between the upper module and the lower module, and in a manner substantially parallel to one of the dissipative surfaces of the lateral module, and
   wherein the motorized mechanism is configured to displace and hold the reflector, in the operational configuration, in a position allowing the reflection of a beam of waves between the radiofrequency source and a predefined zone of coverage of the terrestrial globe.

6. The satellite according to claim 5, wherein the radiofrequency source of the telecommunication device is fixed against one of the dissipative surfaces of the lateral module.

7. The satellite according to claim 5, wherein the radiofrequency source of the telecommunication device is fixed against a surface of the lateral module that is adjacent and substantially perpendicular to the dissipative surfaces.

8. The satellite according to claim 5, wherein the lateral module comprises several telecommunication devices; the satellite further comprising means of communication between the telecommunication devices, the upper module and/or the lower module; the communication means comprising a physical link or a link in free space.

9. The satellite according to claim 1, further comprising a substantially spindly mechanical reinforcement, linking the upper module and the lower module, and able to rigidify the satellite.

10. The satellite according to claim 1, further comprising a set of solar generators held in the storage configuration against one of the dissipative surfaces of the lateral module.

11. The satellite according to claim 10, wherein the set of solar generators is fixed to the lateral module, to the upper module or to the lower module.

12. The satellite according to claim 10, wherein the set of solar generators is linked electrically to the lower module.

13. The satellite according to claim 1, further comprising two lateral modules configured in such a way that, in the storage configuration, respective dissipative surfaces of the two lateral modules are substantially mutually parallel.

14. The satellite according to claim 1, wherein the lateral module is deployed from the storage configuration to the operational configuration by a rotation of an angle substantially equal to 90 degrees.

15. The satellite according to claim 1, wherein the lateral module is deployed from the storage configuration to the operational configuration by a rotation of an angle substantially equal to 180 degrees.

16. The satellite according to claim 1, wherein the upper module and the lower module form two ends of a satellite structure along the Z axis.

17. The satellite according to claim 1, wherein the at least one mission or service facility is linked to the lateral module by a motorized mechanism.

18. The satellite according to claim 1,
   wherein the at least one mission or service facility is linked to the lateral module by a motorized mechanism configured to move the at least one mission or service facility relative to the lateral module between a respective storage configuration and a respective operational configuration, and
   wherein the motorized mechanism is configured to hold the at least one mission or service facility in the respective storage configuration at least in part inside a volume delimited between the upper module and the lower module along the axis Z.

19. The satellite according to claim 1,
   wherein the at least one mission or service facility is linked to the lateral module by a motorized mechanism configured to move the at least one mission or service facility relative to the lateral module between a respective storage configuration and a respective operational configuration, and
   wherein the motorized mechanism is configured to hold the at least one mission or service facility in the respective storage configuration inside a volume delimited between the upper module and the lower module along the axis Z.

* * * * *